(12) United States Patent
Sturgill

(10) Patent No.: US 7,385,710 B1
(45) Date of Patent: *Jun. 10, 2008

(54) MEASURING DEVICE

(76) Inventor: Dennis T. Sturgill, 25600 Normandy West, Perrysburg, OH (US) 43551

( * ) Notice: Subject to any disclaimer, the term of this patent is extended or adjusted under 35 U.S.C. 154(b) by 259 days.

This patent is subject to a terminal disclaimer.

(21) Appl. No.: 11/288,156

(22) Filed: Nov. 29, 2005

Related U.S. Application Data

(63) Continuation-in-part of application No. 10/407,223, filed on Apr. 7, 2003, now Pat. No. 6,975,410.

(60) Provisional application No. 60/372,400, filed on Apr. 15, 2002.

(51) Int. Cl.
*G01B 11/06* (2006.01)

(52) U.S. Cl. .................................... 356/632

(58) Field of Classification Search ............... 356/630, 356/632
See application file for complete search history.

(56) References Cited

U.S. PATENT DOCUMENTS

| | | | | |
|---|---|---|---|---|
| 3,807,870 A | * | 4/1974 | Kalman | 356/630 |
| 4,902,902 A | * | 2/1990 | Tole | 250/559.28 |
| 4,984,894 A | * | 1/1991 | Kondo | 356/632 |
| 5,289,265 A | * | 2/1994 | Inoue et al. | 356/632 |
| 5,291,271 A | * | 3/1994 | Juvinall et al. | 356/632 |
| 5,513,533 A | * | 5/1996 | Wheeler et al. | 73/657 |
| 5,966,214 A | * | 10/1999 | Imbrock et al. | 356/632 |
| 6,285,451 B1 | * | 9/2001 | Herron | 356/630 |
| 6,683,695 B1 | * | 1/2004 | Simpson et al. | 356/632 |
| 6,975,410 B1 | * | 12/2005 | Sturgill | 356/631 |

* cited by examiner

*Primary Examiner*—Tarifur R Chowdhury
*Assistant Examiner*—Isiaka O Akanbi
(74) *Attorney, Agent, or Firm*—Donald K. Wedding

(57) ABSTRACT

A method is provided for measuring the wall thickness of transparent articles using uniform diverging light in the form of a small point source or elongated narrow line of light, measuring the spacial separation of the reflections from the nearest and furthest surface by means of a two-dimensional image sensor and a computational device to calculate the geometrical corrections needed to provide accurate thickness measurements. In situations where significant thickness variations occur, a symmetrical two view embodiment using two uniform diverging light sources and two image sensors at equal but opposite angles of incidence from the same side of the object, provides a means to correct for errors caused by internal prism effects as a result of undulations of either the nearest or furthest surface. This system provides accurate thickness measurements over a wide range of object movement.

13 Claims, 15 Drawing Sheets

Reflected beams for inside camera, scan number 293

MEASURING DEVICE

RELATED APPLICATION

This is a continuation in part under 35 USC 120 of U.S. application Ser. No. 10/407,223 now U.S. Pat. No. 6,975,410, filed Apr. 7, 2003 with priority claimed under 35 USC 119(e) for pending provisional patent application 60/372,400, filed Apr. 15, 2002.

FIELD OF THE INVENTION

The present invention relates to an optical wall thickness measuring device for transparent or semitransparent articles, suitable for high speed measurements on plate, tubing, flat or curved sheets, or a container production line. This invention may be practiced with any transparent material, amorphous or crystalline, which has two surfaces in close proximity to each other, and has flat or positively curved shape.

BACKGROUND OF THE INVENTION

Optical methods have been used to measure the thickness of transparent materials for decades. Specifically, if one directs a small beam of radiation at a uniform smooth transparent plate, then detects and measures the location of the reflections originating from the inner and outer surfaces, at an angle away from normal to the surface, the spacial separation of the two reflections is a function of the angle of incidence and reflection, the optical index of refraction of the plate, and thickness of the plate at the point where the reflections occur. A summary of this technique is taught in U.S. Pat. No. 4,902,902 by Tole. If the transparent plate is not uniform, such that the two surfaces are not parallel, then the spacial separation of the two reflections is also a function of the angle between the two surfaces at the point of reflection and the distance at which the measurement is made.

As used herein, transparent means clear, translucent or partially transmitting such that a discernible image of the second surface reflection can be formed and detected, at some wavelength of electromagnetic radiation.

For many transparent articles or objects such as float glass, windows or glass containers and glass tubing, the parallelism, uniformity, or concentricity of the two surfaces cannot be well controlled for example because of viscosity variations in the plastic forming state. The undulations in the inner or outer surface can cause prism effects, which produce very significant errors in the thickness measurement based on the spacial separation of the two reflections. In this case, if a small collimated light source such as a Laser beam is used for illumination of a flat non-uniform plate, the inside surface reflected beam will not exit the outer surface parallel to the reflection from the outer surface. The spacial separation of the two reflections will then also be a function of the distance from the object to the measuring system and the surface wedge angle in the plane of the two light beams.

Collimated light is a beam of light for which the exiting rays are essentially parallel and does not appreciably change its cross-section area with increasing distance from the source. Non collimated light may be converging or diverging, or a combination of both on different axis.

A problem with collimated or converging source illumination is that it requires exact object surface placement to keep both of the surface reflections within the field of view of the detector. A typical embodiment of the two surface reflection techniques is to set a collimated illumination source and the detector array very close to the article or object being measured. The close proximity of the detector to the article will reduce the offset of the two reflected beams at the detector caused by surface tilt or from internal surface undulations. However, using a short optical path length does not correct for the internal prism error. Also, a close spacing between the wall thickness measurement device and the article being inspected makes it very difficult to measure non-flat or noncircular articles or objects such as flask shaped containers.

Another problem with collimated point source illumination such as a Laser beam, is that each measurement samples only a very small area of the article. A typical situation is provided by rotating a cylindrical article in a captive fixture, as taught by Juvinall et. al. U.S. Pat. No. 5,291,271, allows multiple point measurements to be taken over the entire circumference at one elevation. Measurements at one elevation may not be representative of thickness in the area, and a major thin or thick spot nearby could be missed if it occurs above or below the circumferential scan. The use of multiple scanning heads can provide additional measurements at different elevations, but the vast majority of the article surface is not inspected.

SUMMARY OF THE INVENTION

In accordance with this invention, there is provided a non-contact method and apparatus to measure thickness readings for an article or object over a large area of the article being measured as it is moved or rotated past the measurement apparatus.

Also, there is provided a method and apparatus to simultaneously provide valid measurements for a sheet, plate, or three dimensional positively curved surface in areas of axially non-uniform surface profile such as conical tapers, axial curves and circumferential ribs.

The practice of this invention does not require precise placement of the article being measured with respect to the position of the measurement device.

This invention also allows the measurement of wall thickness for container type articles with noncircular cross section or non-cylindrical contour.

The practice of this invention provides a wall thickness measurement system which optically corrects for prism effects caused by waves and undulations in front or back surface.

In accordance with one particular embodiment of this invention, there is used a diverging source of light with a narrow elongated shape. More specifically, the narrow elongated diverging light source must be provided such that every point on the light source emits light at nearly uniform intensity, in all possible forward directions, thus providing nearly uniform illumination over a large and symmetrical solid angle, centered about a line perpendicular to the surface of the light source and from each and every point on the surface. If this source is viewed from any angle or position, it will be seen as a uniform line of light, and a reflection of this light source from a smooth specularly reflecting surface will appear to be a uniform line of light. This light source is defined as a source of uniform symmetrically diverging line of light.

This type of light source cannot be created, by placing a slit mask in front of a point source of light, such as a circular fiber optic cable as disclosure in U.S. Pat. No. 3,807,870 issued to Kalman. In such an arrangement, all of the light rays passing through the extremities of the mask opening, originate from the outlet of the small fiber optic cable, and do not spread over a symmetrical solid angle normal to the mask from every point on the mask slit. Only rays which pass through the mask centered on the axis of the fiber optic cable spread over a symmetrical solid angle. If this source is viewed from any angle, it will appear as a point source of light, and any refection of this source will appear as a point of light. The same circumstances occur if a cylindrical lens is placed in front of a point source fiber optic cable. All of the light rays originate from the virtual image of the point light source, and will appear as a point of light when viewed from any angle, and any reflection of this source from a smooth surface will appear as a point of light when viewed from any angle.

When the reflection of a uniform symmetrically diverging line of light is observed coming from a thin flat transparent plate, wherein there is a substantial angle between the plane of the plate and the location of the light source, two nearly parallel uniform reflected lines of light will be seen. The separation between these two reflected lines is a function of the angles of incidence and refection, the index of refraction of the material, the distance from the plate to the observer, and the separation of the two surfaces along the length of the reflections. After the geometrical corrections are applied, this configuration provides many thickness measurements in a line across the surface of the plate, thus providing a thickness profile over a track defined by location of the reflections on the plate.

The same type of information can be obtained from a cylindrical object if the symmetrically diverging line of light is oriented parallel to the axis of the cylinder. In addition to geometrical variables outlined above, the separation of the two reflected lines of light is also a function of the radius of the cylinder. However, the method is not limited to objects with constant radius, either axially or circumferentially, as long as the radius of curvature is known at each point on the reflected lines.

A uniform symmetrically diverging line of light can be produced in a number of different ways. One way is to place a long narrow slit in front of a large uniform light diffuser plate, which is illuminated from behind. Rays of light passing through the diffuser are scattered in all directions, such that every point on the exiting surface acts like an independent diverging light source. The length and width of the line of light can be adjusted by the length and width of the slit.

Another way to produce a symmetrically diverging line of light is to use a long, small diameter hot filament inside a suitable elongated transparent envelope. For applications requiring a large field of view, a long slender fluorescent tube can be used, preferably with a high frequency power source. Still another way is to use a light transmitting object, such as a fiber optic cable, with the light output end formed into a long narrow line. The spreading of the light rays exiting from the individual fibers produce a sufficiently uniform symmetrically divergent line of light to practice this invention. A particularly advantageous way to create this light source is to use a column of lensed or non-lensed LED's, with the bodies in lateral contact, such that a continuous line of non-focused light is produced. A narrow slit mask can be used to adjust the width of the source if necessary. The spreading of the non-focused rays exiting the LED assembly also produce a sufficiently uniform symmetrically divergent line of light to practice this invention.

The definition of a uniform symmetrically divergent light source refers to the uniformity of spreading of the light over a large symmetrical solid angle from each and every point on the source. This definition does not rule out placing small opaque marker bars of different spacing on the line source to identify the location on the light source which is being used to make the thickness measurement. The shifting of the marker bars in the field of view of the image sensor allows for a measurement of the axial tilt of the object. A linear or non-linear gradient in light intensity may also be superimposed on the line of light to acquire additional information about the surface of the object. A line of narrow LEDs naturally provide a useful type of intensity modulation if used without filtering.

When the observer in the above examples is replaced with a two dimensional image sensor, such as a digital camera, a suitable lens to magnify and focus the reflection lines onto the sensor, and a digital processor to analyze the reflections, the device becomes a thickness gauge, capable of measuring the wall thickness of the object along the lateral extent of the reflected line. If the article or object is moved perpendicular to the line of light reflection, large areas of the object can be measured.

This technique is especially useful for transparent hollow objects, which can be rotated about their axis. If the line of uniform symmetrically divergent light is oriented parallel to the axis of a cylinder, and the image sensor is placed at a large angle away from the plane formed by the line of uniform symmetrically diverging light and cylinder axis, two lines of reflection will be seen by the sensor, indicating the wall thickness along the line on the object where the reflections are occurring. If the cylindrical object is now rotated about its axis, the entire wall area in the field of view of the sensor can be measured for wall thickness.

A substantial standoff distance can be used for both the line light source and the sensor, typically 2 to 12 inches (50 to 300 mm). If the axis of a hollow cylinder shifts during the rotation, within the limit that the reflections remain in the field of view of the sensor, accurate measurements of the thickness of the walls can still be calculated, providing the change in the location of the reflecting surface relative to the sensor is known. The standoff distance can be selected to provide the largest field of view of the object, consistent with necessary measurement resolution of the distance between the two reflection lines. As the standoff distance is increased, or the angle of incidence and reflection becomes smaller than 15 degrees it becomes increasingly difficult to resolve and accurately measure the separation of the two reflection lines.

The lens used to magnify and focus the reflected lines into the image sensor should be operated with a small entrance aperture to provide the greatest depth of field possible, if large movement of the object is expected. Using a very small entrance aperture will reduce the amount of light reaching the sensor, and thus the speed of the measurement, so a reasonable trade-off must be selected.

It is important to understand that with uniform symmetrically diverging light, the geometry of the measurement will change as the object is moved relative to the light source and sensor. As the object is moved directly toward or away from the light source and image sensor, the angles of incidence, reflection and refraction will change, and the object distance to the sensor lens system will change, but the first surface reflection will always occur at the point on the object where the angle of reflection, normal to the surface, is equal to the angle of incidence. When using collimated or focused light, the angle of incoming light is fixed, and the object must be maintained in the proper position to maintain the angle of reflection which intercepts the sensor.

With a uniform symmetrically divergent line of light, as a flat object is moved laterally, at a constant distance from the light source and sensor, the angles of incidence and reflection will remain essentially the same, but the location of reflections will traverse on the object, always occurring at the location where the angles of incidence and reflection are equal. If the object has positive curvature, the distances from the light source and sensor to the reflection point and the angles of reflection and refraction will also change. In any case, the change in the distance between the reflection point and the sensor will cause a change in the spacial separation of the first and second surface reflections as seen by the image sensor. If the location of the reflections with respect to the light source and sensor, and the radius of curvature at the points of reflection are known, the calculation of the wall thickness based on the measured spacial separation of the reflections is a matter of geometry. Present day high speed computers can perform the necessary geometrical corrections in real time.

The system described above can make sufficiently accurate measurements for most applications providing the wall thickness does not change significantly over short distances and the location of the reflections are known with respect to the light source and sensor. However, regions of changing thickness introduce significant prism into the thickness geometry, leading to significant errors in the measurement based on the separation of the two reflections. Also, the need for accurate positional information limits the usefulness of this technique to situations where the location of the reflections are known.

To overcome these problems and achieve the benefits and advantages of this invention, there is introduced a second line of uniform symmetrically diverging light and image sensor which provides a nearly exact reproduction of the geometry of the first system, but in which the position of light source and image sensor are transposed. For example, if a uniform wall thickness object being measured is stationary and a second light source is moved to exactly the same location occupied by the first sensor lens, and a second lens and image sensor is moved to exactly the same location occupied by the first light source, then the light paths for the two beams reflected from the inner and outer surfaces will be exactly reproduced with the exception that the direction of the light path will be reversed. And in this example, if the distance from the object to both sensors is the same, and the two surfaces are parallel or concentric, the spacial separation of the two inner and outer surface reflections will be exactly reproduced by both light source and image sensor pairs.

However, if this dual light source and sensor system is applied to an object where the inner and outer surfaces are not parallel or in the case of circular cross-section not concentric, such that localized prism effect are produced, each light path which reaches the image sensor will have been deviated as a result of the prism angle. The magnitude of each beam deviation will be equal, but will occur in the opposite direction for each light source and image sensor pair. When the two beam separations are averaged together, after correcting for any differences in object distance for each image sensor, the remaining beam separation depends only upon the index of refraction of the object, the angle of incidence, the separation of the two surfaces and the radius of curvature at the point the reflections occurred.

Using uniform symmetrically diverging lines of light as the light source for the dual path system, each image sensor will see two lines of light with variable line spacing due to wall thickness and prism variations. The prism effects can be eliminated by adding the geometrically corrected spacial beam separations together for each location on the object and dividing by two. If the localized prism effects are severe, the locations of the inner and outer reflections from one of the image sensors may be transposed, indicating a negative thickness. In this case, the algebraic sign of each beam separation must be maintained before the summation occurs.

An illustration of optical correction for prism effects using collimated and subsequently focused light is taught in German PCT Patent Application WO99/56076 by Kiessling et al, where in the superposition of a point source of collimated light and the second system sensor is achieved through the use of beam splitters. This system disclosed in this PCT publication is technically correct, but is largely impractical because precise position of the cylindrical object must be maintained to ensure that both reflection pairs occur at the same point on the object and that the reflected light arrives at the sensor.

In accordance with this invention, the use of uniform symmetrically diverging line light sources for the dual path system removes the requirement for very precise positioning of the cylindrical object. No matter where the object is placed in the field of view of both sensor systems, the two pairs of reflected lines will be seen coming from nearly the same points on the object, and an accurate wall thickness can be calculated, if the exact location of the reflection on an object is known.

The use of two transposed symmetrically diverging light sources and two image sensors also provides the positional information needed to make the necessary corrections in the calculations. That is because triangulation is possible so that each image sensor system can tell the other image sensor system at what object distance the two reflections are occurring. Knowing the two object distances, and the fixed distance between the principal planes of the two light source/image sensor systems, the angles of incidence and reflection can be calculated, thus providing all of the positional information needed to correct the calculation of wall thickness for movement of the reflecting surfaces. Setting the spacing between the two light source/image sensor systems such that the reflection angle between the incident and reflected rays are approximately 90 degrees, provides maximum accuracy for the positional calculation.

This capability makes it possible to make accurate wall thickness measurements on non-round or irregular shaped objects such as flask containers as they are rotated in the field of view of the sensors or any positive curved surface, as it moves past the sensor system, providing the radius of curvature is known at every point to be measured. A positively curved surface is defined as convex toward the image sensor system.

The acceptable curvature variations can be one dimensional (cylindrical) with axis of curvature in either direction, or two dimensional (spherical or ellipsoidal) in either direction. The only special requirement is that both surface reflections must be seen by both image sensors.

The requirement to know the radius of curvature at every point can be a problem if the object is not moved in such a way as to allow the tracking of the surface location in space. If the object motion is known, either by rotation about a fixed axis, or by linear translation perpendicular to the axis of the lines of light, the tracking of the location of the first surface reflections in space, define the radius of curvature at each point on the surface of the object on which the reflections occur.

The three dimensional surface geometry and wall thickness profile can be calculated in real time with dedicated high speed microprocessors.

In the prior art, as shown in U.S. Pat. Nos. 5,259,265 (Inoue) et. al and 5,636,027 (Spengler et. al) collimated light and beam splitters are used in the thickness measurement devices. However, beam splitters are not necessary to obtain the benefits of this invention. It has been found that if the uniform symmetrically diverging light sources are placed very close to the optical axis of the image sensor's lenses, the resulting prism correction can be adequate for many applications. This can be accomplished by placing the line of light very close to the side of the lens, or by providing a mirror which covers a non-transmitting part of the sensor lens and acts to reflect the line of light from the source, such that the virtual image of the light source appears to be closely adjacent to the optical axis and principal plane of each lens when viewed from the object position. The slight offset will produce a small error in the optical correction, but it is insignificant where compared with a single light source and image sensor system.

For highest accuracy, it is important that the source or the virtual image of the source of the diverging non-collimated line source of light fall exactly on the optical axis and at the principal plane of the sensor lens. If it appears in front or behind the principal plane, a slight optical parallax effect will be introduced as the measurement point moves in the image sensor's field of view. One way to accomplish this requirement is with beam splitters wherein the uniform symmetrically diverging line of light is placed at the same distance from the beam splitter as the beam splitter is from the principal plane, and the beam splitter is oriented such that the axis of the virtual image of the line of light intersects the optical axis of the image sensor. It is beneficial, when using beam splitters, to place the diverging source in front of the splitter at an angle as small as possible from the optical axis of the sensor system. The purpose of making the angle small is to avoid as much as possible, the polarization of the light reflecting from the beam splitter. This will help maintain the intensity of the second surface reflection when highly colored or light absorbing transparent objects are being measured.

In one preferred embodiment of this invention, two lines of light are used in which each is considerably longer than needed to illuminate the object in the field of view of the image sensor. The curvature of the surface of the object in the direction of the axis of light line plus the undulations of one or both of the surfaces, may produce a light deflection angle sufficiently large, to move part of the reflected line out of the field of view of the image sensor. Making the line of light longer than what seems necessary will eliminate most of these events.

Another especially useful light arrangement for objects which have flat or cylindrical surface shape such as glass tubing, is to place a short line of uniform symmetrically diverging light above or below the image sensor lens, located at the principal plane of the lens and oriented such that the long axis of the light source intersects the optical axis of the image sensor lens and image sensor. The image sensor and lens are then tilted at a slight angle from normal to the surface of the object, so that the optical axis of the image sensor and lens are directed near the midpoint of the objects surface reflection of the symmetrically diverging line source. With a substantial stand-off distance of 2 to 8 inches (50 to 200 mm) the tilt angle need only be 1 to 3 degrees. The error introduced by this slight tilt is equal to $(1-\cos \emptyset)/n$ where $\emptyset$ is the tilt angle and n is the index of refraction of the object. The resulting error is usually below 0.1 percent, totally insignificant for most on-line measurement. Any of the described techniques for creating a symmetrically diverging line of light can be used in this manner to provide very accurate measurements of wall thickness without the use of beam splitters or mirrors.

One advantage of LED line lighting is that the LED's can be strobed, with a short on time at high current, followed by longer period in the off state. For objects moving at high speed, this technique will reduce the motion blur, resulting in sharper line images and higher accuracy. Fiber optic cables can also be illuminated on the entrance end with focused LED lighting, to provide a higher intensity line light source at the exit than can be provided with individual LED's formed into a line source. These can also be strobed to reduce motion blur.

The ability to measure the wall thickness of objects as they move through the field of view of the sensor system, provides the capability to measure multiple objects at one time, covering the full surface area of each. For example, cylindrical objects moving laterally in single file, such as transparent containers or plastic container preforms, can be completely inspected, if each object is rotated such that one complete rotation occurs as it passes through the field of view of both image sensors. The objects can be very close together, even touching, as they pass through the field of view. A pair of reflected lines will be seen on each object, which will track across the circumference of each object as it is rotated and translated. A substantial number of objects may be in the field of view at any one time, depending on the size of the objects relative to the field of view of the image sensors. For high speed applications, it may be necessary to limit the number of objects in the field of view at any one moment, because of the time required to collect and process the reflection data from multiple objects.

Simple objects with positive curvature in two axis can be measured over large areas of the surface as they are passed in front of the system in a linear motion. There is no size limitation on the objects which can be inspected with this invention. Very small objects such as tiny glass spheres or contact lenses, or very large objects which would use long fluorescent light tubes as the two uniform symmetrically diverging light sources. An example is curved windshields moving down a conveyor after the bending operation. The system can verify the curvature and measure the thickness of large percentages of each object as it passes under or in front of the system.

DESCRIPTION OF DRAWINGS

Figure 1:
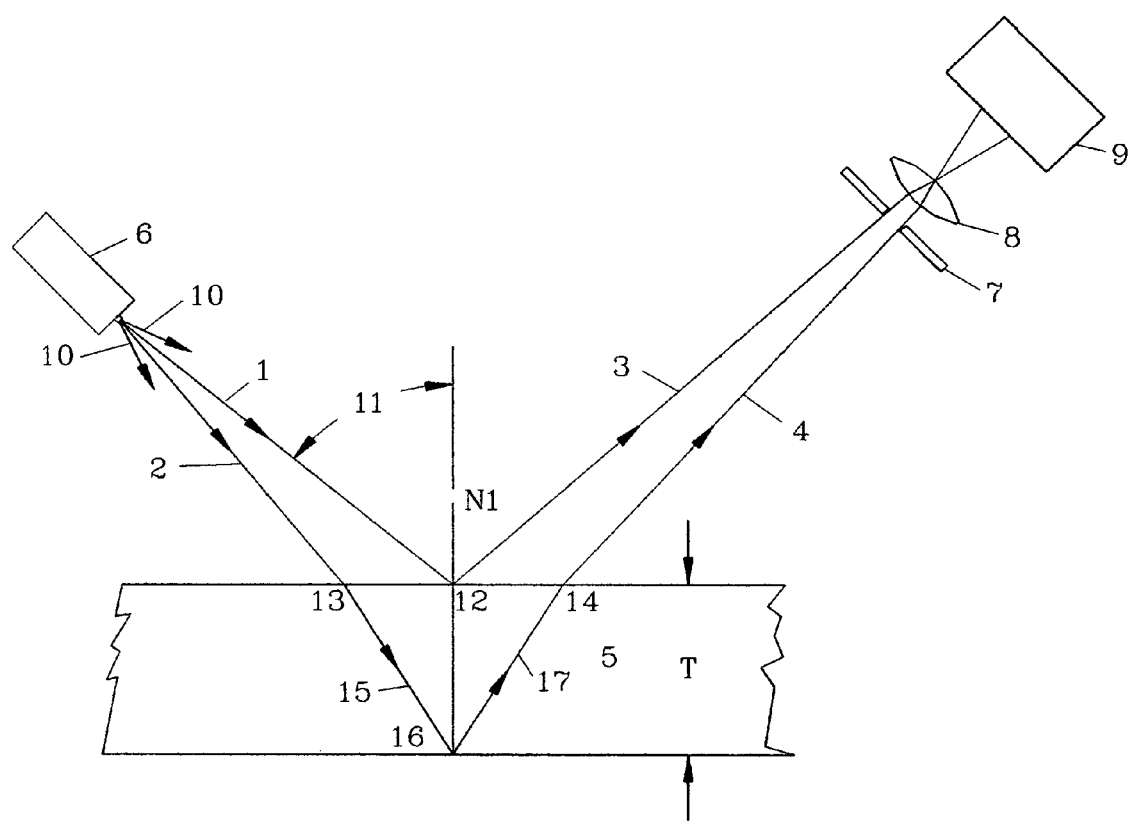
FIG. 1 shows a diagram of an embodiment of an apparatus for measuring the wall thickness of a uniform transparent object.

FIG. 1 shows a simplified diagram of the reflections of a diverging light source 6, originating from a uniform transparent plate 5, with thickness T, at some arbitrary angle 11 away from normal to the surface N1. Suitable angles fall in the range of 15 degrees to 75 degrees. The light source 6 may be a single point of light or a line of light with axis parallel to the surface such as can be produced by the filament of an incandescent bulb. When the light rays coming from the source represented by line 1 encounter the first surface of the plate at point 12, part of the beam is reflected along path 3 for which the angle of reflection is equal to the angle of incidence and the resulting beam trajectory passes through the lens aperture 7. Light rays passing through aperture 7, then pass through imaging lens 8 which focus the rays on the active array of the image sensor 9. A second ray of the incident light represented by line 2, encounters the plate 5 at point 13 and part of the beam is refracted into the plate along path 15. This beam encounters the back side of the plate at point 16 and a portion of the beam is reflected along path 17, then again encounters the first surface of the plate at point 14. After refraction back to the original angle of incidence, the ray represented by line 4 passes through the lens aperture 7, at a different angle than first surface reflection ray 3. All of the other rays represented by lines 10 emanating from light source also produce reflected and refracted rays, but they do not arrive at the lens aperture and therefore are not focused onto the measurement sensor 9.

Since the beams of light 3 and 4 enter the lens 8 at different angles, each is focused on the sensor 9 at a different location. The spacial separation of the two beam images on the sensor is a function of the angle of incidence, the optical index of to refraction of the plate, the distance from the plate to the sensor lens, the magnification of the lens and sensor system and the thickness of the plate T. If the index of refraction of the plate and the angle of incidence are known, the spacial separation of the two beams is a direct indicator of the plate thickness assuming that the magnification of the image on the sensor 9 by the lens 8, is known and fixed. Note that if the plate 5 in FIG. 1 is tilted, it has the same optical effect as rotating the position of the light source and sensor system. Then different rays will reflect from the inner and outer surfaces at different angles of incidence and reflection, and the location of the reflection will move to a new location wherein the angles of incidence and reflection are equal. This new location cannot be easily determined, which forces the practical requirement that the plane of the object remains fixed, such as placement in a flat surface.

Usually a lens assembly represented by 8 is used to produce an image of the two reflected light spots on a sensor which can quantify the separation of the two beam images. The beam separation is converted to wall thickness readings either by geometrical calculations or by comparison with calibration charts produced from measurements with known thickness plates.

Figure 2:
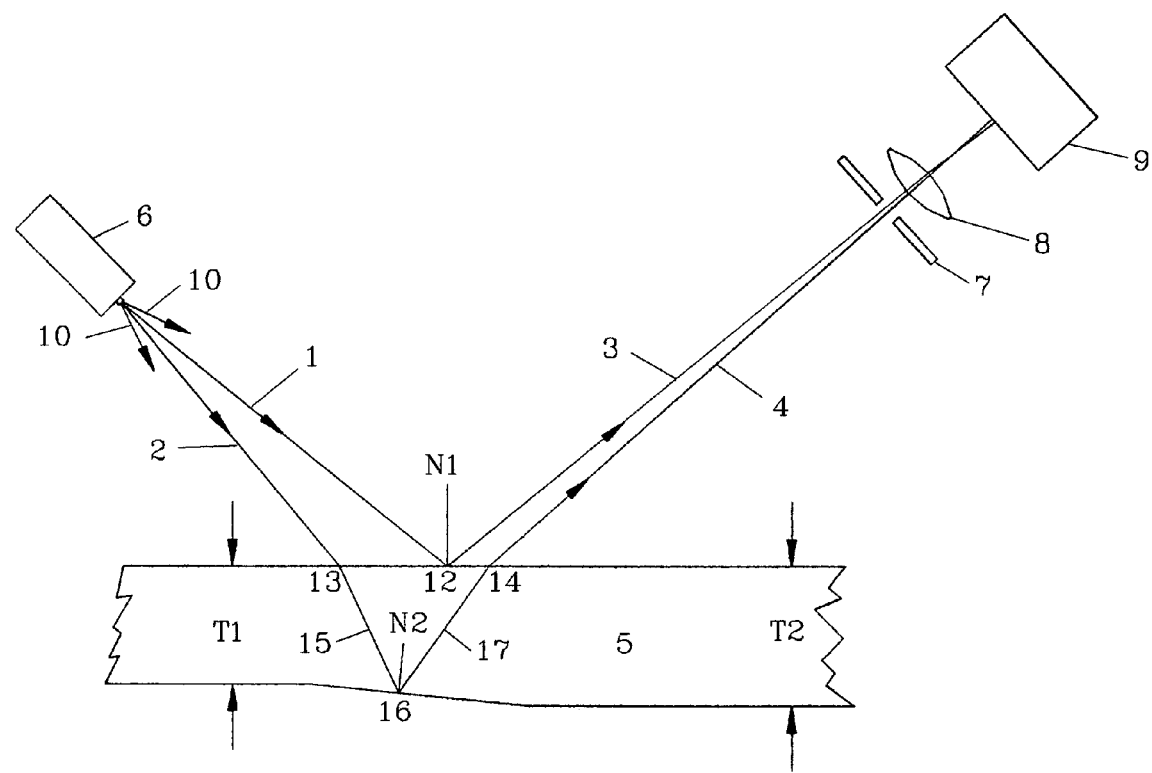
FIG. 2 shows a diagram similar to FIG. 1 in which the plate thickness makes a change from thickness T1 to thickness T2.

FIG. 2 shows a similar diagram in which the plate thickness makes a change from thickness T1 to thickness T2. In this case when the refracted internal ray 15 encounters the second surface at a point 16 where the thickness is changing, it is again reflected at an angle equal to its angle of incidence with respect to the normal of the second surface N2. The angular deviation produced by the sloped second surface is equal to twice the slope angle. When the internally reflected ray re-encounters the first surface at point 14, it is refracted at a wider angle further increasing the beam deviation error. In this case, spacial separation of ray 3 and ray 4 now depends on the second surface slope angle and how far the measurement sensor is away from the plate.

The change in the direction and separation of the internally reflected rays is called the prism effect. Very slight changes in the parallelism between the first and second surface, can cause significant errors in the wall thickness measurement based on reflected beam separation. Even with a close spacing between the object being measured and the sensor assembly, the internally reflected beam can be deviated to such a degree that is misses the sensor completely. When a diverging light source is used, as shown in FIG. 2, a reflected and refracted light path which reach the sensor usually exists, but the internally reflected ray may be deviated to such a degree that the rays which reach the sensor may cross over the first surface reflection indicating a negative thickness. In the past, this problem has discouraged the use of diverging light.

Figure 3:
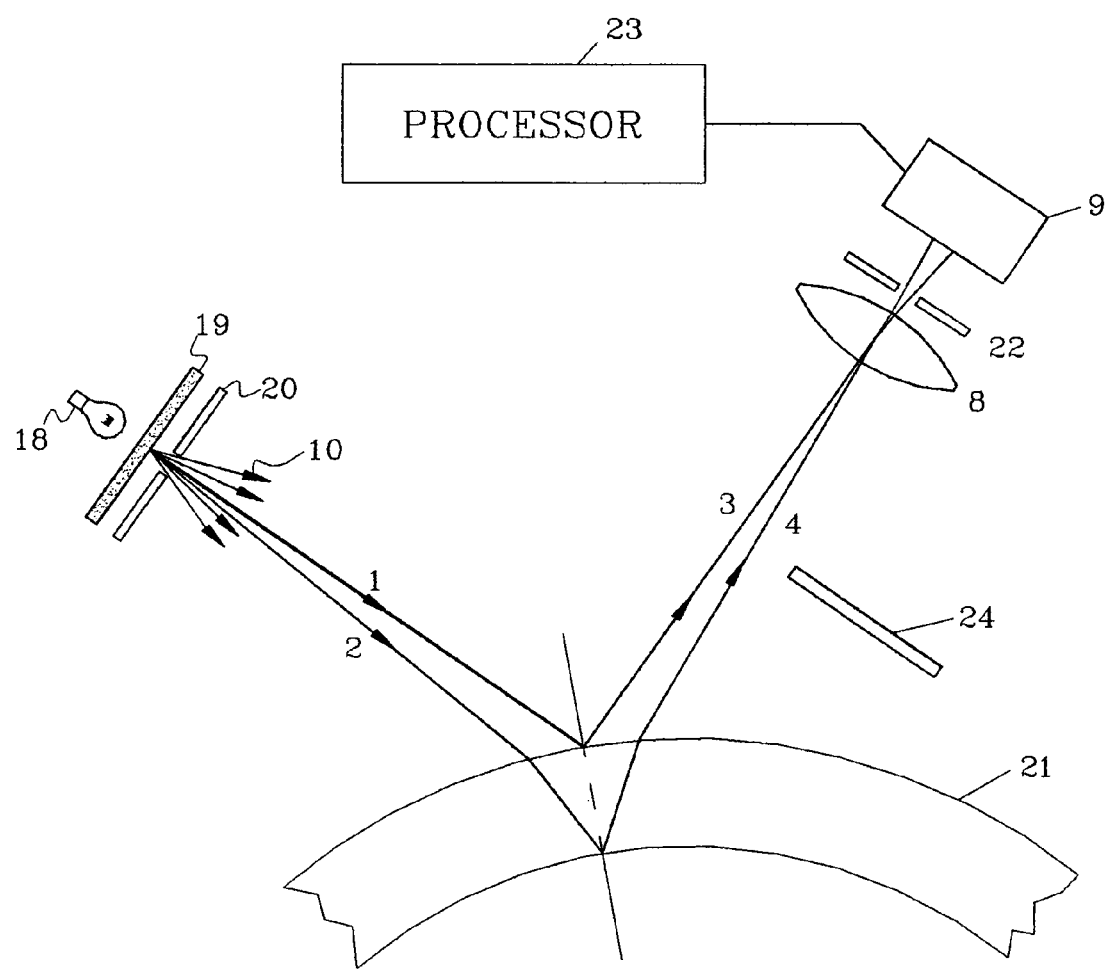
FIG. 3 shows a schematic diagram of an alternative embodiment for measuring wall thickness using a uniform symmetrically diverging line of light.

An illustration of the optical geometry created when using a symmetrically diverging line light source to measure the wall thickness of a positively curved uniform wall thickness hollow object, is shown in FIG. 3. The source of light 18 can be an incandescent light bulb or any luminous source of sufficient intensity. In this case, a light diffuser 19, is placed between the light source and a narrow vertical slit 20 to ensure uniformity of the multitude of light rays passing through the slit. The narrow slit is shown in cross-section, so that only the width of the slit is illustrated in the drawing. The long axis of the narrow slit is shown as parallel to the cylindrical axis of object 21.

This light source assembly is placed at a suitable distance from the article to be measured, typically 2 to 12 inches (50 to 300 mm). A sensor assembly consisting of an imaging lens 8, an aperture stop 22, and a two dimensional sensor array 9 is also placed at suitable distance from the article to be measured, typically 2 to 12 inches. The light source assembly and the image sensor assembly are separated in such a way that the sum of the angle of incidence and the angle of reflection, falls in the range of 30 degrees to 150 degrees. The two-dimensional image sensor array must be designed to provide a large enough field of view to capture both the outer or first surface and the inner or second surface reflections for the desired height of the inspection and for the expected movement of the reflections due to an irregular shape of the article, or movement of the article in the field of view. This is accomplished by adjusting the standoff distance and magnification of lens 8.

The light rays, 1 and 3, which reach the sensor in FIG. 3 will reflect from a line on the outer surface of the object, where the angle of incidence, normal to the surface equals the angle of reflection. The magnitude for these angles will depend on distance between the light source and the detector assembly, and the distance to the object. The light rays, 2 and 4, which are refracted and internally reflected will be reflected on the same radial line as the outer surface reflection, but will follow a displaced path caused by the thickness of the wall and the refractions at the outer surface.

The location of the two reflections which reach the sensor will move on the surface of the object as the object is moved around the field of view of the sensor assembly. In order to accurately calculate the wall thickness represented by these reflections, the light source location and the distance from the principal plane of the optical system to the reflections must be known. If the only movement of the object or article is pure rotation, then knowing the location of the light source and sensor, and the profile and the orientation of the object is sufficient. These data will allow the calculation of the angle of incidence and reflection at any point on the object and also provide the necessary magnification correction for the reflection images on the sensor array 9.

Also shown in FIG. 3 is a digital processor 23 which provides the capability of rapidly processing the reflection data transferred from the image sensor, applying the necessary geometrical corrections to convert the image data to wall thickness values. In some situations, it is useful to apply a panel mask 24, which partially blocks light which would strike the back side of the object, thus eliminating back side extraneous reflections.

When the second surface is not parallel to or coaxial to the first surface, the location of the second surface reflection will be shifted to a point where the angle of reflection, normal to the second surface, is equal to the angle of incidence after both beams have been refracted at the first surface. As discussed earlier, this shift causes a deviation in the spacial separation of the two reflections which reach the image sensor. Consequently, the system in FIG. 3 is accurate only for objects which have nearly parallel or concentric surfaces.

Figure 4:
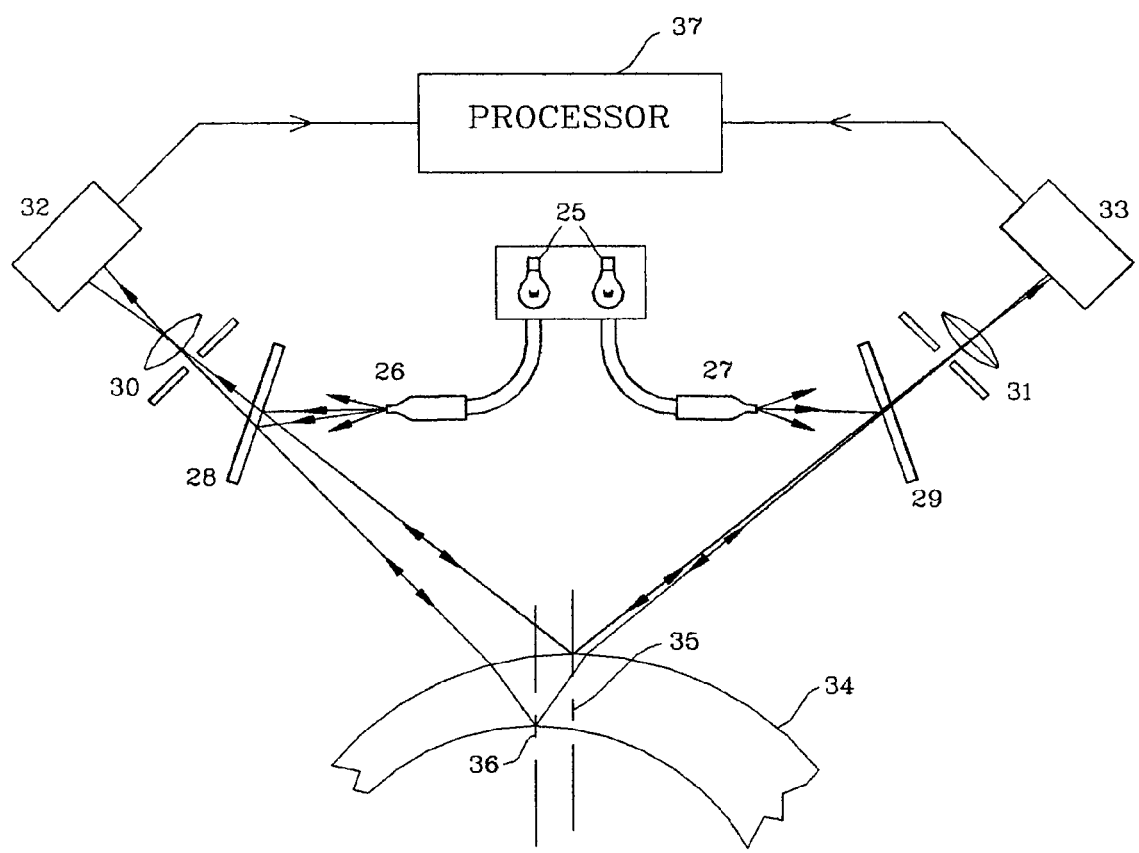
FIG. 4 shows another embodiment of apparatus for measuring wall thickness of a non-concentric curved object utilizing two beam splitters.

FIG. 4 shows an accurate and sometimes preferred embodiment of this invention applied to a curved object, which does not have concentric inner and outer surfaces. In this case the light from one or more light sources 25 is directed into two optical fiber bundles, 26 and 27, which convert the light beams into two long narrow effectively uniform symmetrically divergent light sources. The long axis of the line lights 26 and 27 are perpendicular to the plane of the drawing. The light exiting the fiber optic bundles is directed toward two beam splitters, 28 and 29, which provide approximately 50 percent reflection and 50 percent transmission. Both of the beam splitters are oriented at an angle so as to reflect 50 percent of the light toward the object to be measured, such that the virtual image of the line of light is superimposed on the optical axis and principal plane of the corresponding lens systems, 30 and 31, when viewed from the object location. The distance from the line lights 26 and 27 to the reflection point on the beam splitters 28 and 29 is made to be the same as the distance from the reflection points to the principal plane of lenses 30 and 31, in order to eliminate parallax effects.

The lenses 30 and 31 focus the image of the reflections originating from the object on the respective sensor arrays 32 and 33. Image sensor 32 receives the reflected light originating from fiber optic source 27 after passing through the beam splitter 28 and image sensor 33 received the reflected light originating from fiber optic source 26 after passing through the beam splitter 29. The two systems are symmetrical mirror images of each other.

If a flat parallel plate or a uniform wall thickness concentric cylinder is placed in the field of view of both sensors, the images arriving at the sensors will be identical, but reversed in position. To be more specific, the left hand sensor, 33, will see the second surface reflection to the right of the first surface reflection and the right hand sensor, 32, will see the second surface reflection to the left of the first surface reflection, but both will measure the same spacial separation between the two reflections.

In the illustration of FIG. 4, the object to be measured 34 does not have concentric inner and outer surfaces. The rays of light reflecting from the outer or first surface will follow exactly the same path from source 27 to sensor 32 and from source 26 to sensor 33, both reflecting along the outer radius line 35. The portion of light passing through the beam splitters will form the same first surface reflection image on both sensors. However, the location on the second surface where the angle of incidence is equal to the angle of reflection after first surface refraction, is shifted toward the line of the inner radius of curvature 36. The rays of light reflecting from the inner surface will still follow the same path from source 27 to sensor 32 and from source 26 to sensor 33, but the location of the reflection on the inner surface will be shifted to the points on the inner surface where angles of incidence and reflections are equal. This shift in reflection location will cause an increase in the spacial separation of the two reflected rays arriving at left hand sensor 32 and a reduction in the spacial separation arriving at the right hand sensor 33. These two deviations will be almost identical in magnitude for each optical ray path. There can be a very small difference in the two deviations due to the slight difference in the angles of refraction at the first surface. For thin walled curved articles where the radius of curvature is at least ten times the wall thickness, this error is negligible for all practical purposes.

The processor 37 in FIG. 4 receives the digital data from both two dimensional image sensors, makes the magnification and image registration corrections if necessary, and adds together the spacial separation for each corresponding point on the object, then divides by two to extract the spacial beam separation representing the wall thickness at each point on the object, along the line of reflection.

Figure 5:
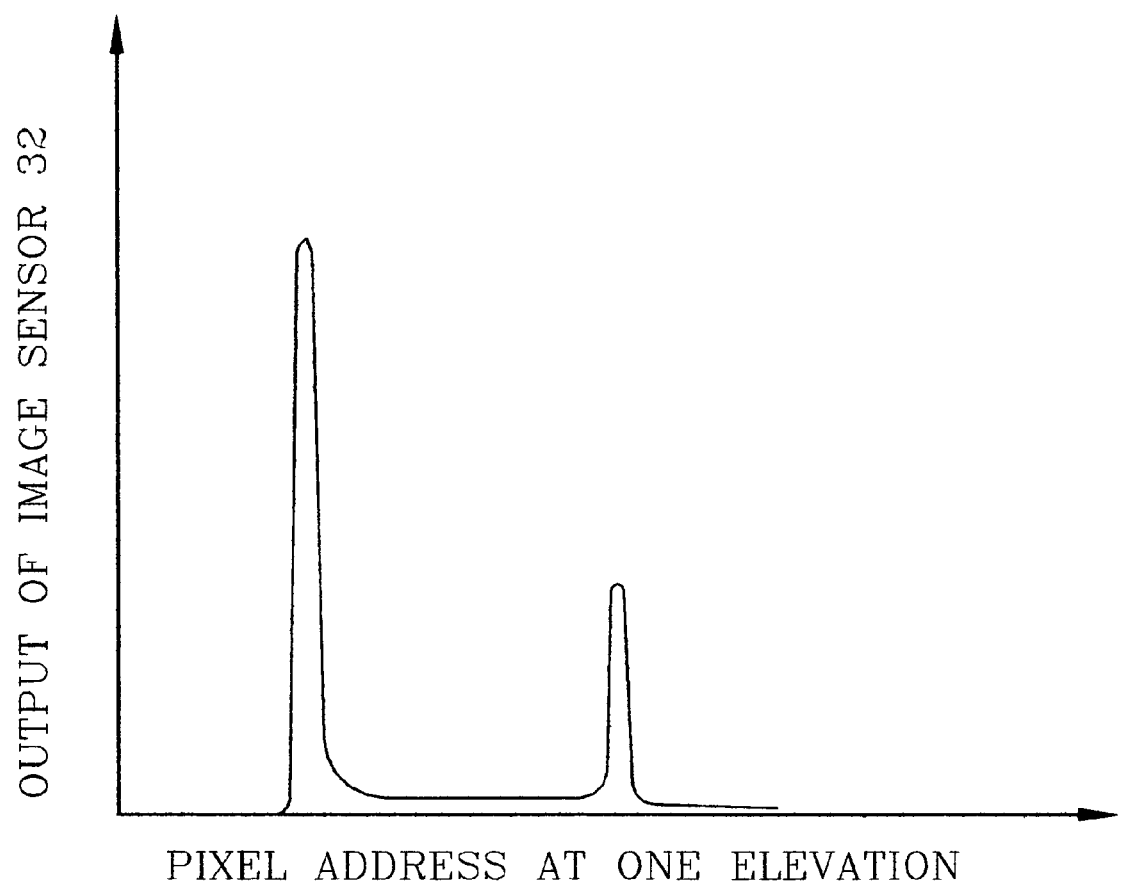
FIG. 5 shows the relationship and intensity of the two reflections from a point on the object which reaches the left hand sensor 32 of FIG. 4.

FIG. 5 shows the relationship and intensity of the two reflections from a point on the object which reaches the left hand sensor 32. The first surface and second surface reflections can be distinguished because the first surface reflection will always provide a more intense reflection.

Figure 6:
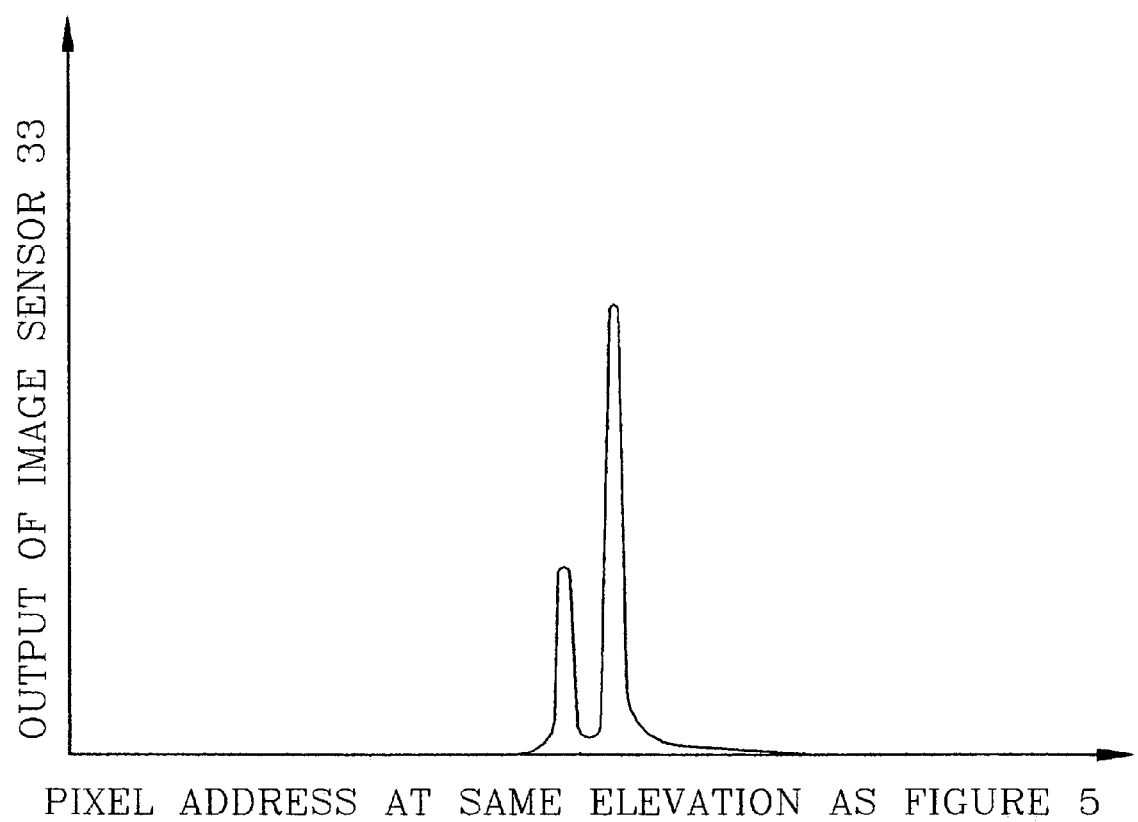
FIG. 6 shows the corresponding reflection images seen by the right hand sensor 33 of FIG. 4.

FIG. 6 shows the corresponding reflection images seen by the right hand sensor 33 at the same point on the object. If the object distance and magnification of right and left sensors are equal, the two spacial separations can be averaged together to determine what the spacial separation would be if no prism effect was present. If the object distance is not equal, the magnification corrections must be applied before averaging the two spacial separations.

The spacial separation of two reflections can be measured in several ways. One convenient way is to calculate the location of the centroid of each reflection, in fractions of a pixel, and then subtract the smaller pixel centroid value from the larger value. Another way is to curve fit the line of each reflection peak and interpolate for the location of each reflections maximum location, then subtract the maximum locations to determine the spacing between them.

Figure 7:
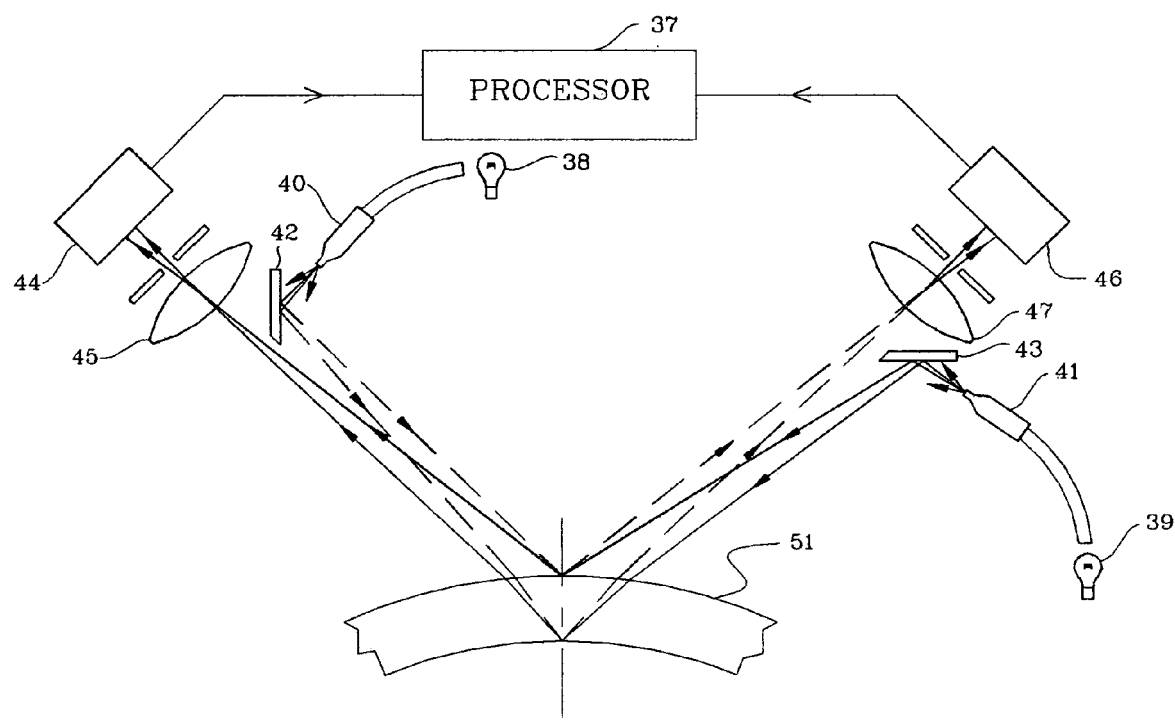
FIG. 7 shows another embodiment which uses reflecting mirrors instead of the beam splitters of FIG. 4.

FIG. 7 shows an embodiment contemplated for the practice of this invention which uses reflecting mirrors instead of beam splitters. Light from one or more light sources 38 and 39 is directed into two optical fiber bundles 40 and 41 which convert the light beams into two long narrow essentially uniform symmetrically diverging light sources. The light exiting the fiber optic bundles 40, 41 is directed toward two mirrors 42 and 43 which are situated on the same side of the image sensor and lens systems 44, 45, and 46, 47. Both of the mirrors 42, 43 are oriented at an angle, so as to direct the light toward the object 51 being measured, such that the virtual image of the line of light source appears as close as possible to the optical axis and principal plane of the lens systems 45 and 47, when viewed from the object 51 location, without blocking the return reflected rays from the object, on their way to the image sensors 44, 46.

With this arrangement of line light sources 40 and 41, image sensor 44 and image sensor 46 see reflections which occur at the same point on the object 51, but with slightly different angles of incidence and reflection. Image sensor 44 receives reflected light originating from fiber optic source 41, shown as solid lines. Image sensor 46 receives reflected light originating from fiber optic source 40, shown with dashed lines, which uses slightly smaller angles of incidence and reflection such that the rays it uses fall inside the rays used by sensor 44.

In this case, if a flat parallel plate or a uniform wall thickness concentric cylinder is placed in the field of view of both sensors, the spacial separation of the first and second surface reflections will not be identical at each of the sensors. The separation imaged at sensor 46 will be slightly smaller than the separation imaged at 44, because the system 40 to 46 will utilize a slightly smaller angle of incidence and reflection with respect to the normal to the surfaces. This small difference is minimized by making the standoff distance as large as possible while retaining the necessary optical resolution. The significance of this slight difference will be further reduced when a known wall thickness calibration object is used to establish the relationship between reflection separation and wall thickness for each sensor.

When the object or article 51 in FIG. 7 does not have uniform walls, the second surface internal reflections will be deviated by the prism effect as was described for FIG. 4. However, in this case the beam deviations will be slightly different because the angles of incidence, reflection and refraction are slightly different. By keeping the difference in the angles of incidence between the two sensor systems very small through the use of a large standoff distance, the thickness reading error caused by simply adding the two beam separations will be insignificant for most measurement applications.

If the line light sources 40 and 41 and mirrors 42 and 43 are placed on opposite sides of the sensor assemblies, for example, both inside or both outside, then the outside surface angles of incidence and reflection can be made to be nearly equal, but the two sensor assemblies will be viewing the internal reflections from two slightly different points on the internal surface of the object. In some cases this may turn out to be advantageous.

Figure 8:
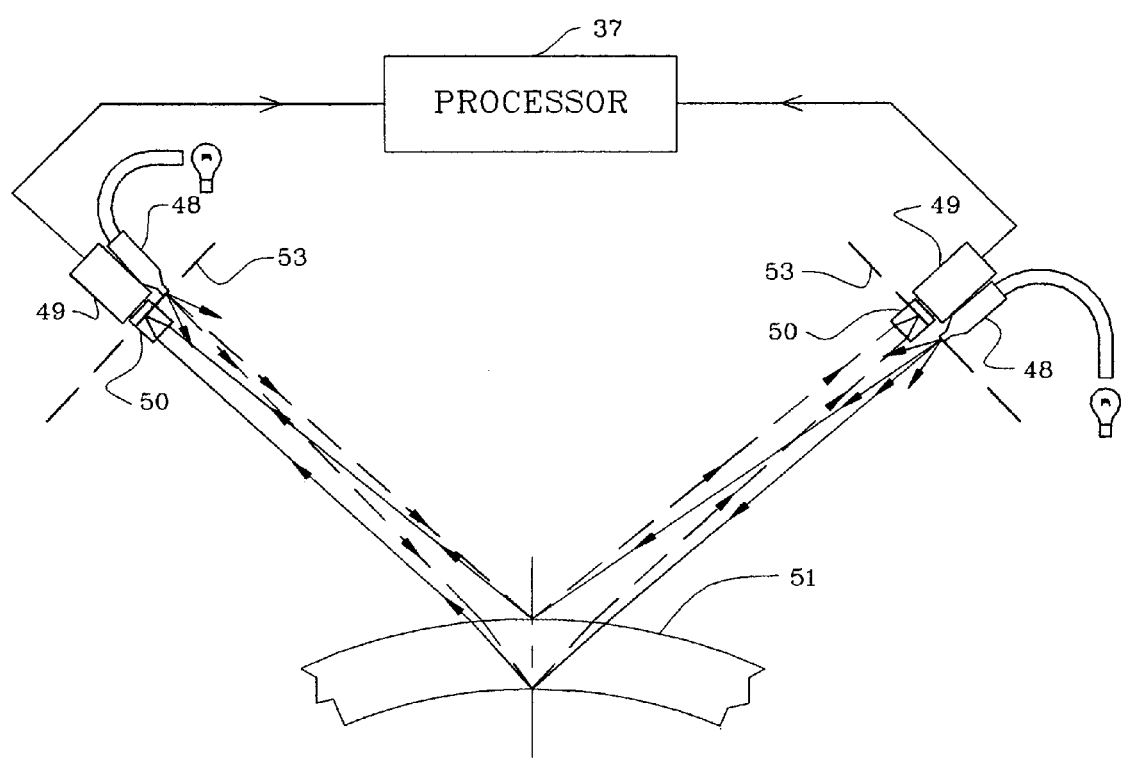
FIG. 8 shows a very simple and low cost embodiment of this invention wherein all mirrors and beam splitters are eliminated.

FIG. 8 shows a very simple and low cost embodiment of this invention wherein all mirrors and beam splitters are eliminated. The fiber optic line lights 48 are placed as close as possible to the side of the two image sensor lenses 50, such that the long axis of the line light sources are perpendicular to the plane of the two intersecting optical axis of the image sensors and parallel to the axis of curvature of the object 51. In this case the light source is located in the principal plane 53 of the sensor lenses 50 shown as a dashed line, but cannot be made to coincide with the optical axis of the image sensors. This configuration produces the same type of small thickness errors as the mirror configuration in FIG. 7, but would be preferable in situations where it is necessary to maintain a large field of view of the image sensors.

If the uniform symmetrically diverging line of light is made very narrow compared to the diameter of the entrance aperture of the sensor lens 50, and placed directly on the optical axis of the sensor lens such that a substantial part of the return reflected rays can pass on one or both sides of the light source, this embodiment can make thickness measurements nearly as accurate as the beam splitter system shown in FIG. 4, providing the sources are small enough to appear at the entrance aperture of the sensor lenses 50. This can be accomplished with a narrow line of Light Emitting Diodes or an elongated incandescent light bulb with a thin envelope, masked on one side toward the image sensor to prevent the light from illuminating the image sensor directly.

Figure 9:
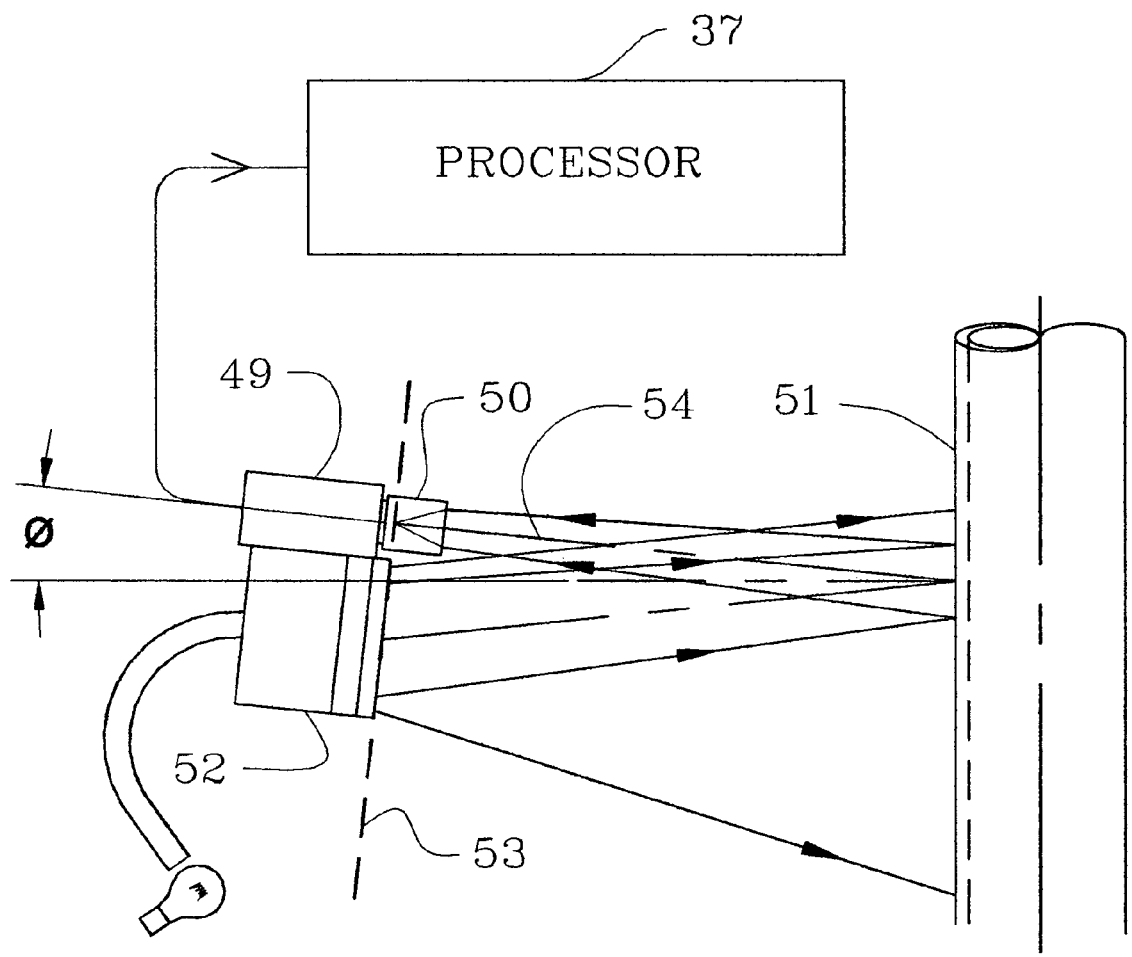
FIG. 9 shows an alternative arrangement of the linear light source and image sensor lens.

The most advantageous arrangement of the adjacent uniform symmetrically divergent line light source for the dual sensor system for small objects is shown in FIG. 9. In this case the image sensor 49 and lens 50 are tilted at a small angle Ø, with respect to the normal to the surface of the object 51, and the light source 52 is placed above or below the sensor lens 50, such that the long axis of the line light 52 intersects the optical axis 54 of the image sensor lens 50 and falls near or within the principal plane 53 of the sensor lens 50. The angle Ø is adjusted so that optical axis of the image sensor 49 and lens 50 intersects the reflected image of the light source near the center, to accommodate variations in surface waviness.

Figure 10:
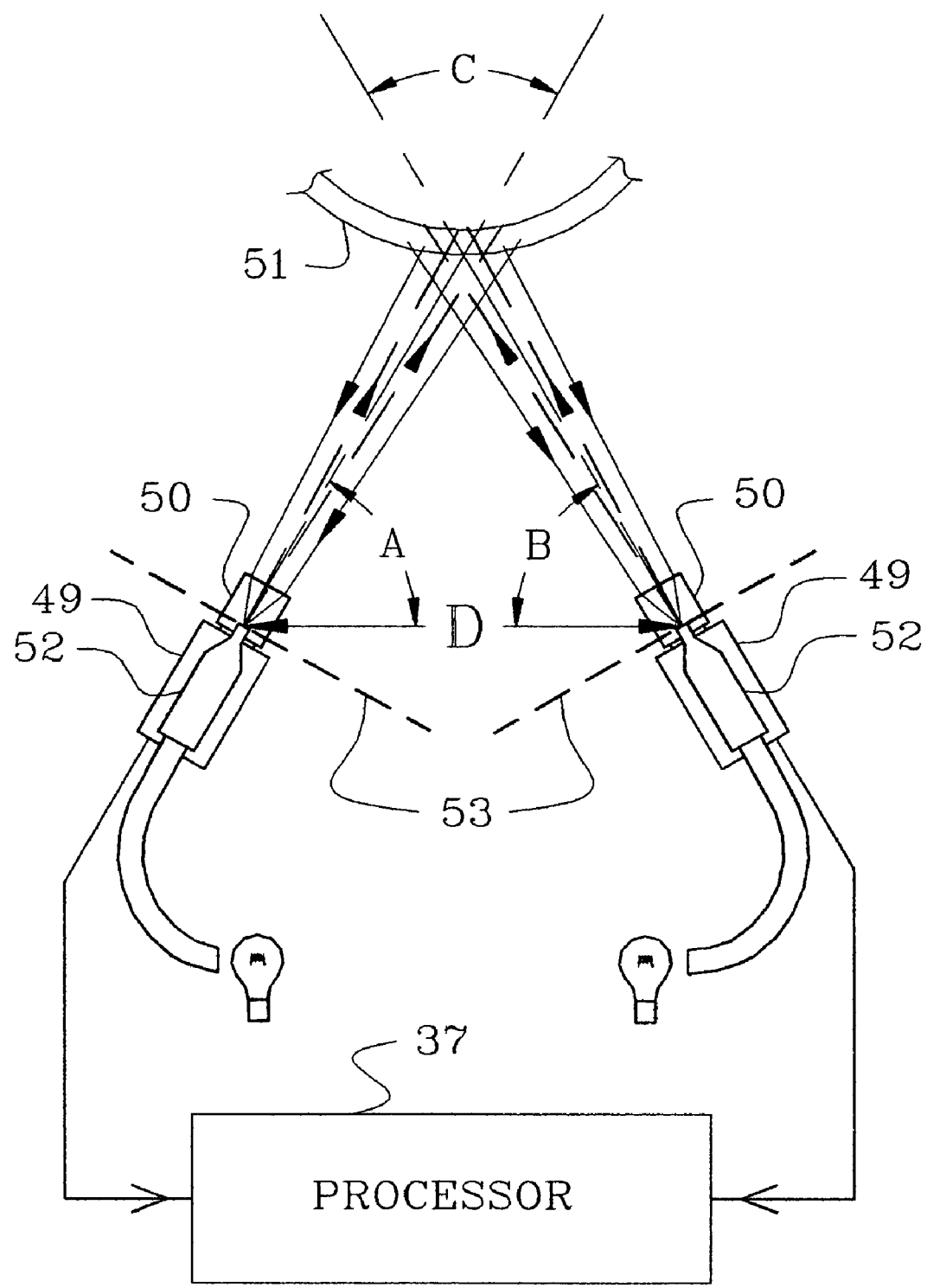
FIG. 10 shows a plan view of the two light sources and two image sensor configurations utilizing the alternative arrangement of FIG. 9.

In FIG. 10, a second light source 52 and lens 50, identical to the arrangement described in FIG. 9, is placed at a large angle from the first light source and image sensor 49, in the plane perpendicular to the axis of curvature as shown in FIG. 10, each having the same small tilt angle with respect to the object 51. This arrangement eliminates the slight parallax error which is introduced as a result of the light source 52 at some distance from the optical axis and principal plane of the sensor lens 50, and replaces that error with a slight trigonometric error introduced because the refracted light path is not exactly normal to the surface at the point of the measurement. For a tilt angle of 3 degrees and index of refraction of 1.5, the error introduced is 0.09 percent at the center of the field of view of the image sensors. Also shown in FIG. 10 is the distance between the optical axis of the sensor lenses, designated as the distance D. This distance and the two object distances from the principal planes of the two image sensor lenses to the point where the optical axis of the two image sensors intersect, defines the center point geometry from which all object movement is referenced. An alternate technique is to measure the angles A and B, which each optical axis makes with respect to the line connecting the two principal plane points. The object distances are then determined by the triangular intersection of the two optical axis. In either case, as the reflection lines move in space, due to object movement or angular change, the new reflection angles and fixed distance between the image sensors, provide all the information needed to determine the exact location of the reflection point, and thus the means to mathematically correct the thickness measurements for changes in object distance. Setting the angle between the two optical axis shown as C, to 90 degrees provides the highest resolution for determining the reflection locations.

The length of the two symmetrically diverging lines of light 52 are made to be as short as possible and no longer than necessary to maintain a complete reflected line in each camera, over the expected range of movement or tilt of the object surface. The length of the light source must always be at least twice the length of the intended field of view on the object.

Figure 11:
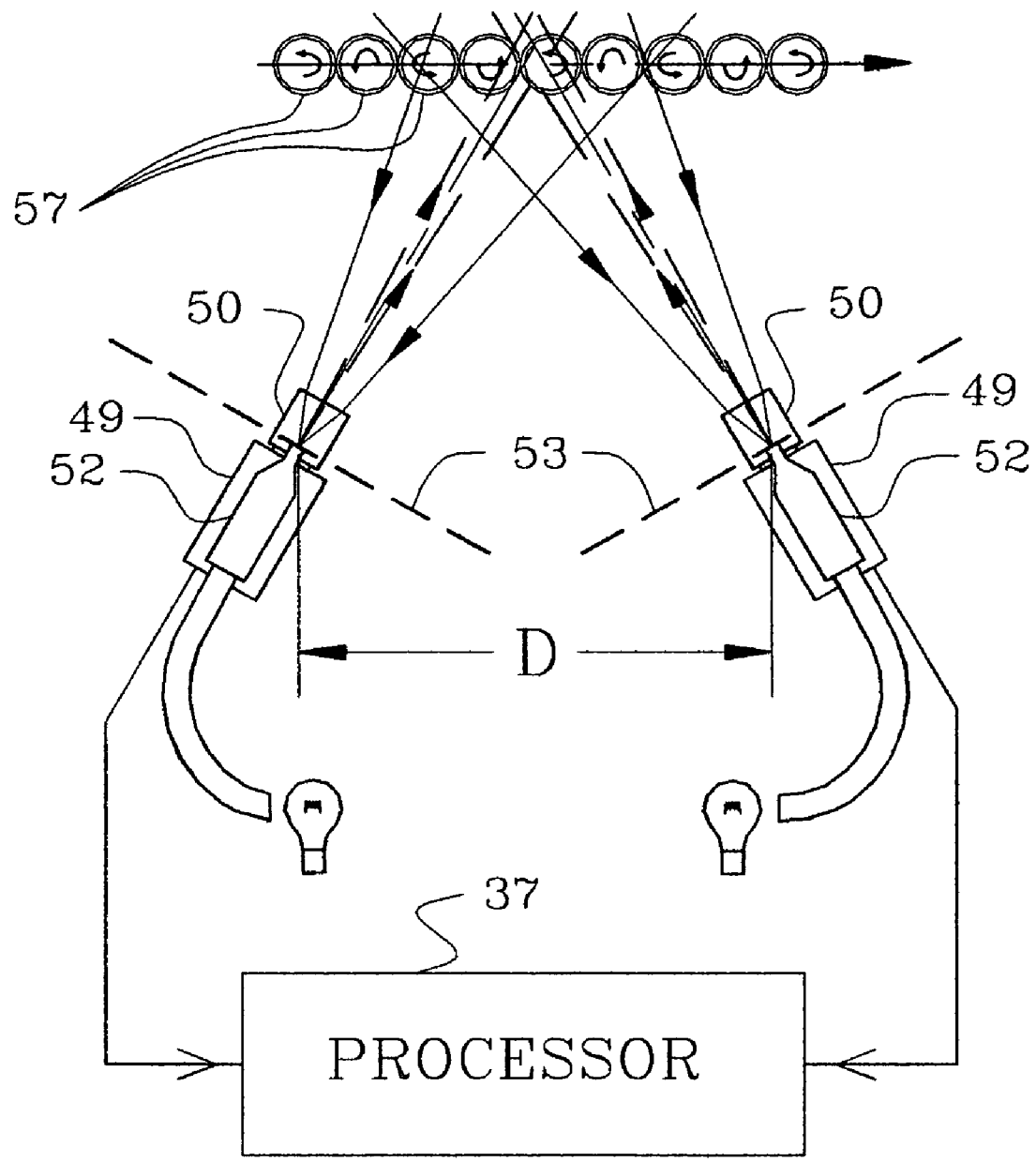
FIG. 11 shows the adaptability of using the two symmetrically diverging line light sources and two image sensors to measure multiple objects at one time.

FIG. 11 shows an example of one system inspecting multiple objects simultaneously as they pass through the field of view of the wall thickness measurement system. In this case, a column of cylindrical objects 57 are translating from left to right, while simultaneously rotating, such that each object completes one full rotation while passing through the field of view of the image sensor systems 49. Symmetrically diverging line light sources 52 are placed above or below the camera in the same configuration as shown in FIG. 9. By optimizing field of view and optical parameters, the complete sidewall of each object can be inspected as it passes through the system, thus providing 100 percent verification of proper wall thickness and absence of defects. Typically, two to six objects can occupy the inspection zone at one time. The processor 37 accumulates the data on each object, compares it with allowable quality deviations, and issues a signal to remove any out of tolerance objects from the stream. The objects can be many shapes with two dimensional positive curvature and slope, limited only by the extent of the symmetrically divergent line light sources and their surface reflections.

Figure 12:
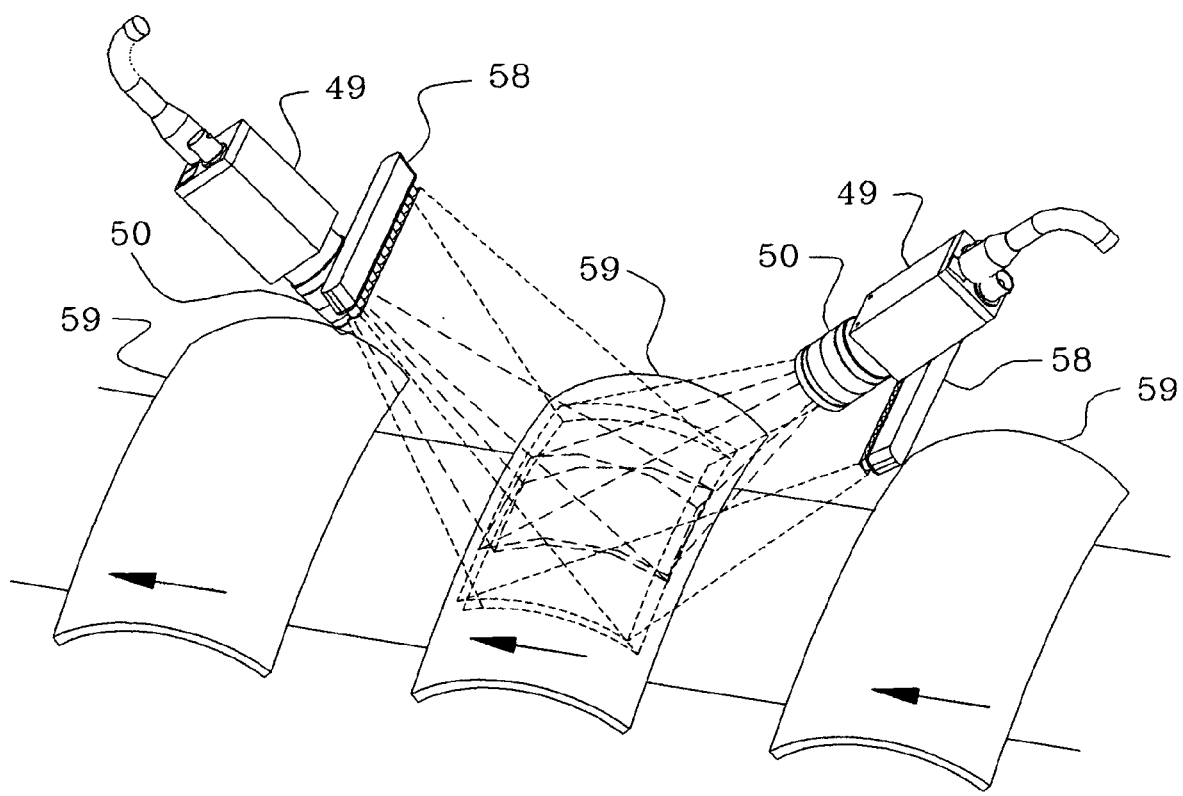
FIG. 12 shows the use of this invention to measure the contour and wall thickness over areas of positively curved objects as they pass in front of the system.

FIG. 12 shows a line of curved transparent windows 59, such as automotive side lites which are passing under the inspection system with the curved side up. If the conveying system is flat or follows a known horizontal and vertical track, the two dimensional curvature of each lite can be tracked and calculated at the same time as the material thickness is measured over the illuminated path provided by the symmetrically divergent light sources and their surface reflections. The degree of curvature which can be accommodated, depends on the angular field of view of the two camera systems. In this illustration, the light sources 58 are shown to be linear arrays of LEDs.

Figure 13:
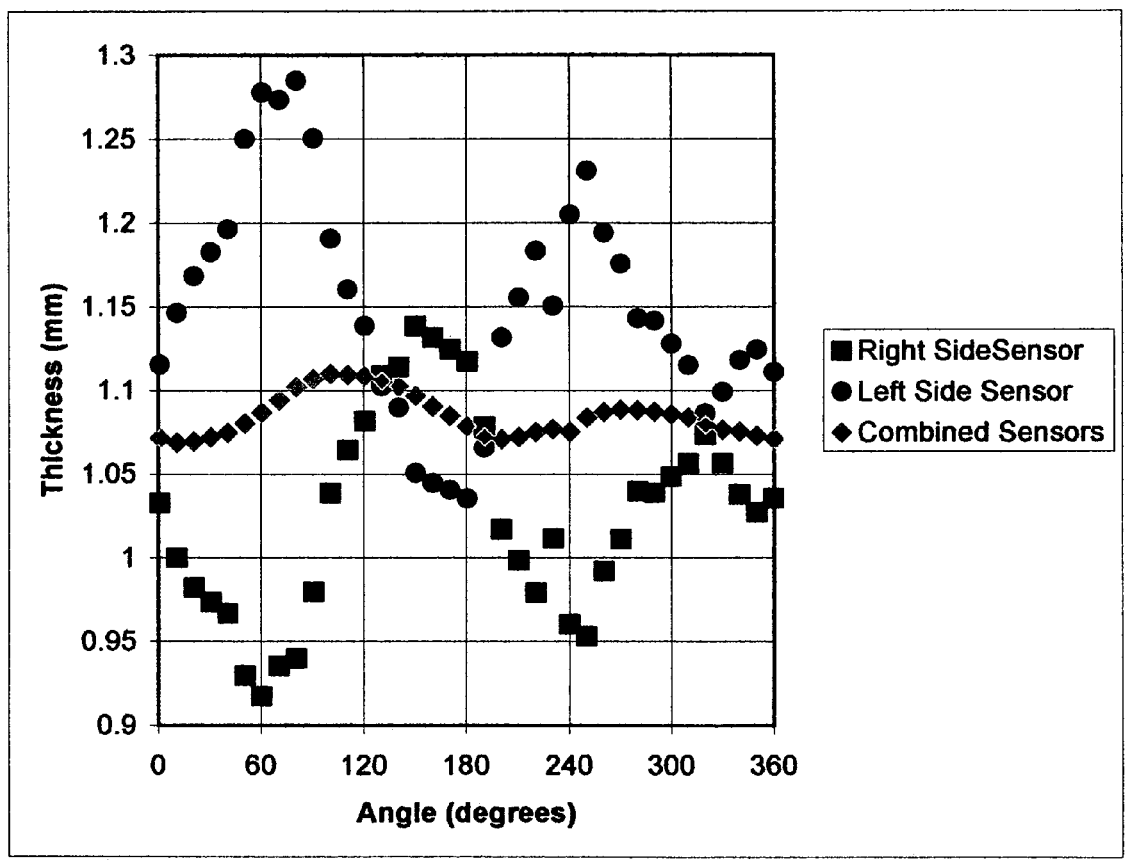
FIG. 13 shows a wall thickness measurement comparison between an uncorrected optical beam reflection system and a reverse path corrective measurement for a circumference profile measurement for a 22 millimeters diameter glass tube with a 1.08 millimeter nominal wall thickness.

FIG. 13 shows a wall thickness measurement comparison between an uncorrected optical beam reflection system and a reverse path corrective measurement for a circumference profile measurement for a 22 millimeters diameter glass tube with a 1.08 mm nominal wall thickness. These data were taken every 10 degrees with an optical system of the type shown in FIG. 8, using a standoff distance of 8 inches (200 mm). The uncorrected data show wide swings in the apparent wall thickness due to internal prism effects, ranging from 0.92 to 1.28 mm. The optically corrected data falls within a range of 1.068 to 1.110 mm. The corrected measurements fall within the allowable tolerance for wall thickness variations. The uncorrected measurements do not.

Figure 14:
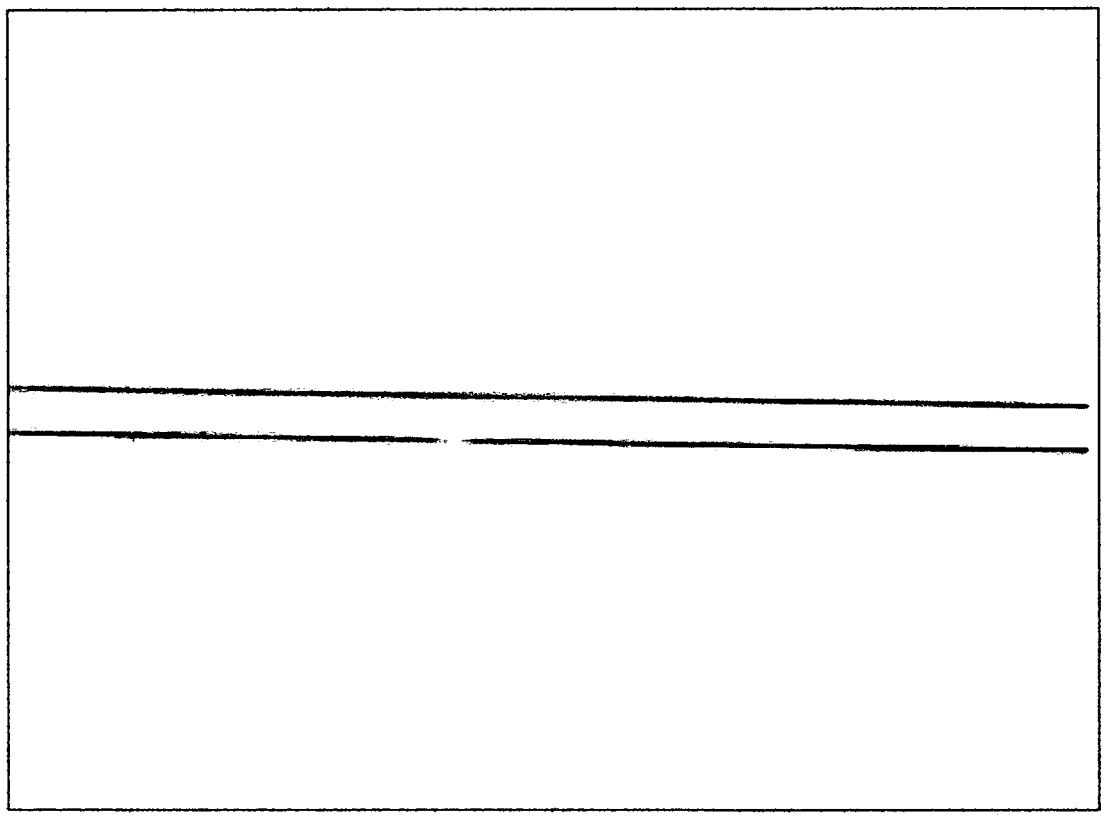
FIG. 14 shows the actual reflection images from one sensor viewing a glass tube, which provided the data shown in FIG. 13.

FIG. 14 shows the actual reflection images from one sensor viewing the glass tube which provided the data shown in FIG. 9. An interesting feature of this image is the gap in the second surface reflection produced by a very small optical defect in the tube wall. Any of the embodiments of this invention shown in FIGS. 4 through 6 can provide an optical flaw detection in all of the surface areas on which the wall thickness is measured.

Figure 15:
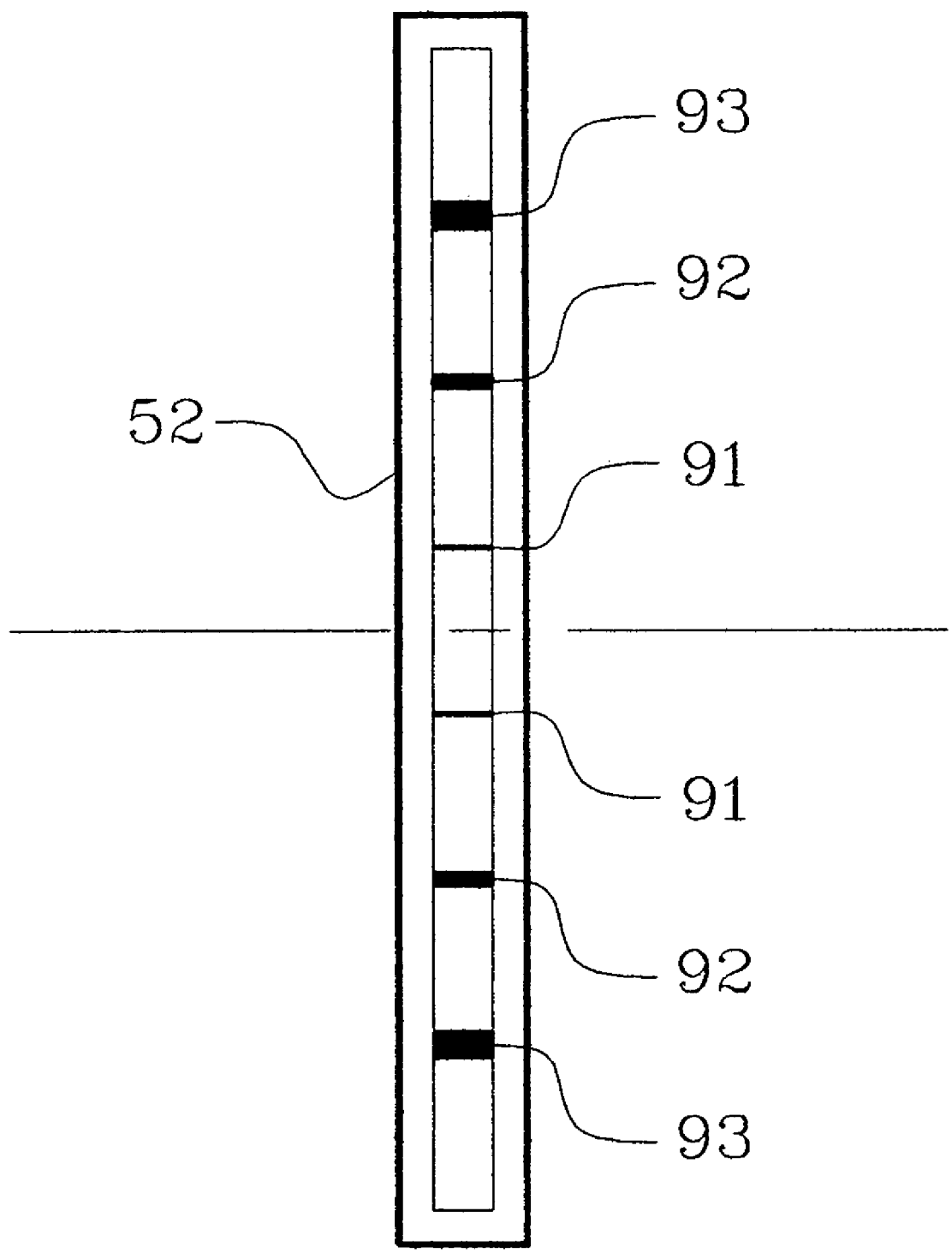
FIG. 15 shows the arrangement of small opaque mask lines on the face of a uniform symmetrically diverging line source.

FIG. 15 shows the light output end of a fiber optic line light 52 in which variable width, opaque marker bars 91 thru 93 are applied. As the object surface tilts in the same direction as the long axis of the light source, the degree of tilt can be measured by the vertical shift in the position of the dark bars in the image of the light source. These bars also provide a useful reference for the initial alignment of the image sensor lens and location of the light source with respect to the object being inspected.

The invention claimed is:

1. A method for measuring the wall thickness of a transparent object wherein two uniform symmetrically divergent light sources and two area type image sensors are provided such that the light from each light source is redirected so that it appears to be originating from within the optical axis of each image sensor and located at the principal plane of each image sensor lens and the spacial separation measurement of the two reflections from the object obtained by each sensor combined to provide an accurate measurement of the wall thickness after corrections for the variable angles of incidence and reflection, and object distance are applied.

2. The invention of claim 1 wherein each light source is a long narrow uniform symmetrically divergent light source.

3. The invention of claim 2 wherein the object is a container with non-cylindrical geometry.

4. The invention of claim 1 wherein multiple objects are measured simultaneously as two or more objects move through the field of view of the image sensors at one time so as to provide accurate measurements of the wall thickness of multiple objects with or without rotation of the objects within the field of view of the image sensors.

5. A method for measuring the thickness of the wall area of a transparent object, wherein two uniform symmetrical divergent elongated light sources and two area type image sensors are provided such that each light source illuminates the object from a position whereby both are either above or below the lens portion of each image sensor so that the axis of the elongated line of light intersects the optical axis of the lens at the location of the principal plane of the lens and is aligned essentially parallel to the axis of curvature of the object, and the optical axis of each measuring sensor is tilted upward or downward to intersect reflected line images of the light source near the center of its long axis.

6. The invention of claim 5 wherein the reflected line images from the object are used to detect optical flaws or anomalies on either surface or in the wall of the object.

7. The invention of claim 5 wherein the light source for illumination the object is an optical fiber assembly.

8. The invention of claim 5 wherein the transparent object is a glass or plastic tube, bottle, jar, or container.

9. The invention of claim 5 wherein each source for illuminating the object is a narrow column of light emitting diodes.

10. In a method for measuring the wall thickness of an object wherein there is a light source and an image sensor having a lens, the improvement wherein there is a first light source and a first image sensor having an image sensor lens and a second light source and a second image sensor having a image sensor lens, each light source being narrow and elongated so as to provide uniform symmetrically diverging light with the long axis of the first light source intersecting the optical axis of the first image sensor lens at the principal plane and the long axis of the second light source intersecting the optical axis of the second image sensor lens at the principal plane, so as to provide a prism and parallax correcting optical system for the measurement of wall thickness on irregular thickness transparent objects.

11. The invention of claim 10 wherein the light source for illumination the object is an optical fiber assembly.

12. The invention of claim 10 wherein the transparent object is a glass or plastic tube, bottle, jar, or container.

13. The invention of claim 10 wherein each source for illuminating the object is a narrow column of light emitting diodes.

* * * * *